March 24, 1936. H. E. MILLER 2,035,331
SERVICE ENTRANCE FITTING
Filed Dec. 1, 1933 2 Sheets-Sheet 1
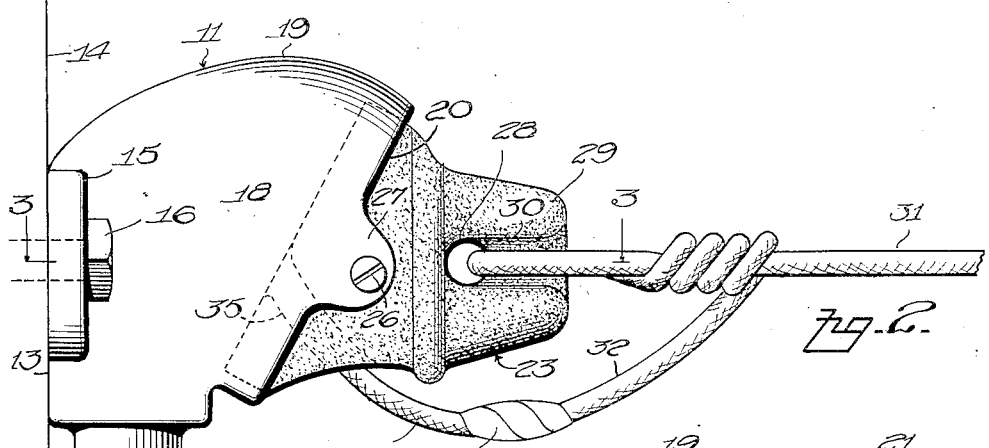
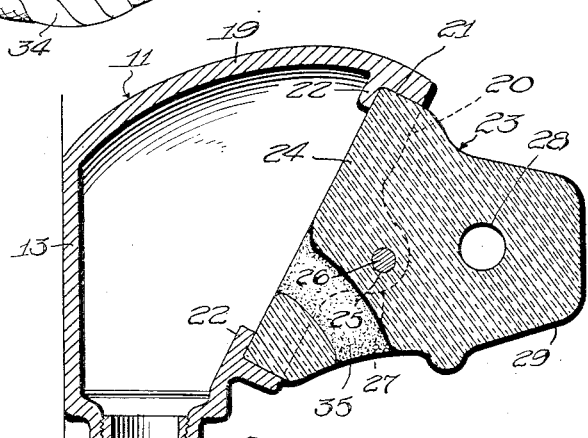
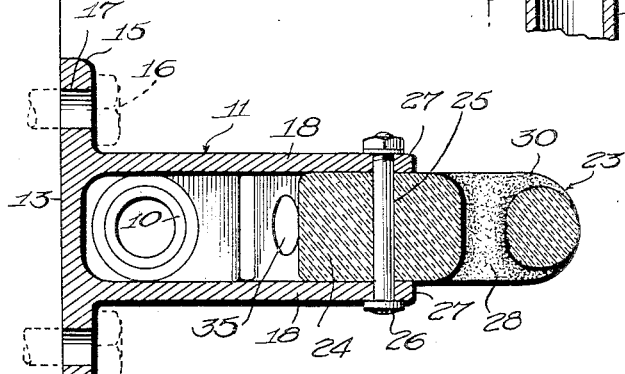
Inventor
HERBERT E. MILLER
By C. L. Parker Jr.
Attorney March 24, 1936.　　　　H. E. MILLER　　　　2,035,331
SERVICE ENTRANCE FITTING
Filed Dec. 1, 1933　　　　2 Sheets—Sheet 2
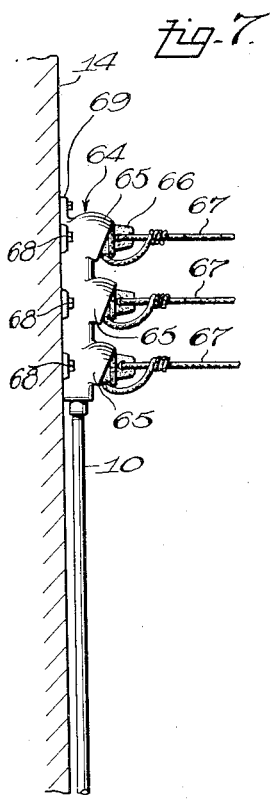
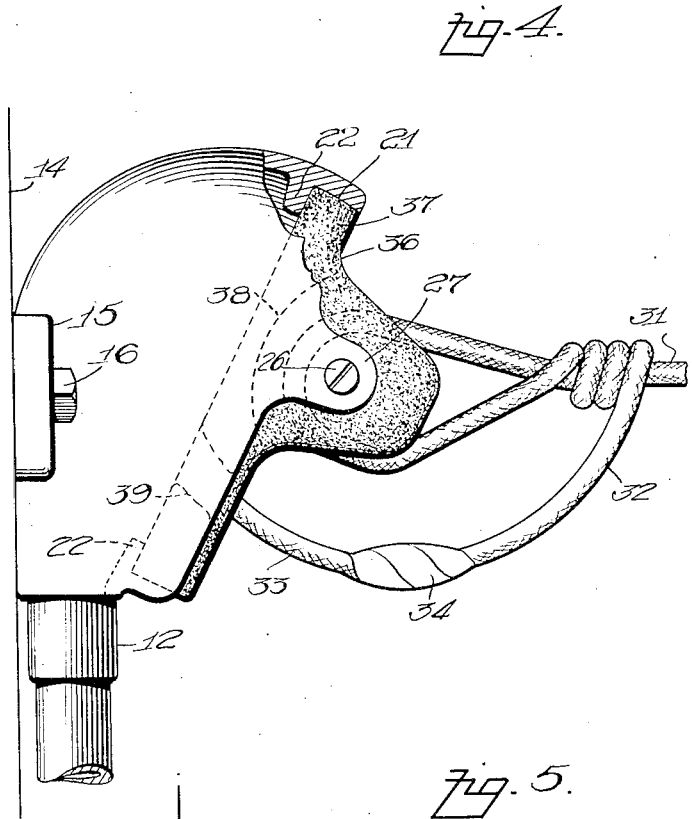
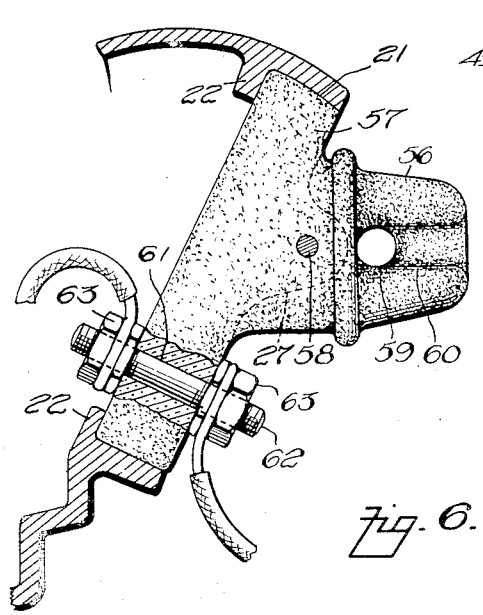
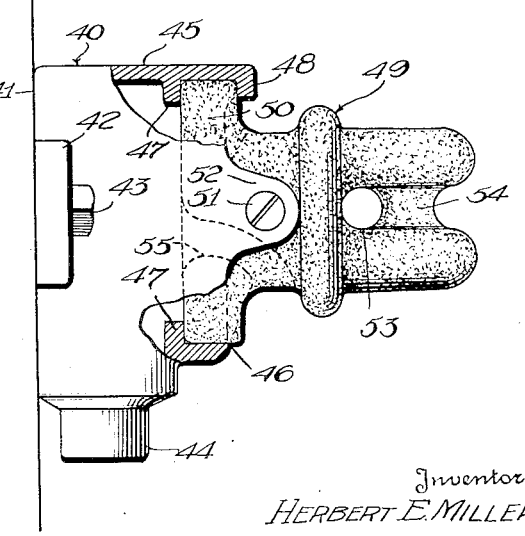
Inventor
HERBERT E. MILLER Patented Mar. 24, 1936

2,035,331

UNITED STATES PATENT OFFICE 2,035,331

SERVICE ENTRANCE FITTING

Herbert E. Miller, Allentown, Pa., assignor to Utilities Service Company, Inc., Allentown, Pa., a corporation of Pennsylvania Application December 1, 1933, Serial No. 700,587

10 Claims. (Cl. 247—6)

This invention relates to a service entrance fitting, and more particularly to a combined condulet structure for carrying electrical service lines into houses and other buildings.

It is the present practice to secure a conduit against an outer face of a building and to mount a condulet of any standard type at the upper end thereof. A service bracket is secured to the wall of the building adjacent the condulet and usually thereabove, and the service wires are "dead-ended" to the service bracket. The lead-in wire to the condulet is then soldered to the service wires.

It is an important object of the present invention to reduce the cost of materials and installation required for providing service entrances for buildings by eliminating the usual service bracket.

A further object is to provide novel means combined directly with a novel condulet structure for dead-ending the service wire with respect to the condulet instead of employing a separate service bracket.

A further object is to provide a novel strain insulator directly connected to a condulet and to which the service wire may be dead-ended.

A further object is to provide a device of the character referred to wherein the insulator is provided with an entrance opening to permit the running of the wire into the condulet, and wherein the entrance of water into the condulet through such opening is prevented.

A further object is to provide a device of the general character indicated wherein installation costs are greatly minimized by the minimizing of the time necessary for the installation of the device.

In the drawings I have shown several embodiments of the invention. In this showing:

Figure 1 is a side elevation of the device in operation, showing a portion of the service wire and a portion of the conduit, Figure 2 is a central vertical sectional view through the same, the wire being omitted, Figure 3 is a section on line 3—3 of Figure 1, the wire being omitted, Figure 4 is a view similar to Figure 1 showing the modified form of the device, parts being broken away, Figure 5 is a similar view of a further modified form, Figure 6 is a fragmentary central vertical sectional view of a further modification, the insulator being shown in elevation with a portion thereof broken away, and, Figure 7 is a side elevation illustrating the use of the invention in multiple.

Referring to Figure 1, the numeral 10 designates a standard electric conduit to the upper end of which is secured a condulet 11. It will be noted that the condulet is provided with a cylindrical lower boss 12 internally threaded to receive the externally threaded upper end of the conduit 10. The condulet is provided with a rear flat wall 13 which seats against the wall 14 of a building to which the device is connected. The condulet 11 is provided on opposite sides thereof with attaching ears or lugs 15 having their rear faces flush with the outer face of the wall 13 to lie against the building wall 14. Attaching screws 16 of any desired type project through suitable openings 17 formed in the attaching lugs 15.

The condulet is preferably provided with opposite flat parallel integral walls 18, as shown in Figure 3. These walls are connected at their tops by an integral curved top wall 19. The condulet has its forward portion sloping downwardly and inwardly toward the conduit 10, as indicated by the numeral 20, and such forward portion of the conduit is provided with an opening 21 for a purpose to be described. Inwardly of the opening 21, the condulet is provided at least at the top and bottom thereof with lugs or flanges 22.

A strain insulator indicated as a whole by the numeral 23 has a rear sloping portion 24 corresponding in shape and size to the opening 21 and arranged therein, the inner face of the insulator adjacent its upper and lower ends engaging against the flanges 22. The insulator is provided with a transverse opening 25, as shown in Figures 2 and 3. A bolt 26 extends through this opening and through integral apertured ears 27 extending forwardly from the side walls 18 of the condulet. The insulator is further provided with a wire receiving opening 28 extending transversely therethrough, as shown. The insulator is provided with a reduced tapered portion 29 extending outwardly from the condulet and this projecting portion of the insulator is provided with grooves 30 communicating at their rear ends with the opening 28.

The service wires from the pole are indicated in Figure 1 by the numeral 31. The service wires are, in fact, carried in a cable 31, and for the purpose of the present description, the cable will be treated as a single wire. Accordingly any reference to a "wire" in the following description is understood to refer to the usual conductor carrying two or more wires. The wire 31 is dead-ended by being looped through the insulator opening 28, and the free end 32 of the service wire is then soldered to the lead-in wire 33 in the usual manner. This soldered connection may be taped as at 34. The insulator 23 is provided beneath the bolt 26 with a lead-in opening 35, and it will be apparent that the lead-in wire extends upwardly and inwardly through the sloping opening 35 and thence downwardly through the conduit 10.

The form of the invention shown in Figure 4 is very similar to the form previously described. The condulet may be identical with the forms of these devices described above, and accordingly the same reference numerals have been employed to designate the corresponding parts in Figure 4. In the latter figure, however, a different insulator is employed and is designated as a whole by the numeral 36. This insulator is provided with a base portion 37 arranged in the opening 21 and seating against the flanges 22. The attaching bolt 26 extends through the ears 27 and through the insulator as in the previous case. Instead of providing the insulator with a wire attaching opening arranged outwardly of and in the plane of the bolt 26, however, the insulator 36 is provided with an arcuate opening 38 extending therethrough inwardly of and at right angles to the bolt 26. The advantage of this arrangement lies in the fact that the insulator may be made somewhat shorter, as will be apparent. As in the previous case, the wire 33 extends into the condulet through an inwardly and upwardly sloping opening 39 similar to the opening 35 previously described.

In the form of the invention shown in Figure 5, a different type of condulet is employed and is indicated by the numeral 40. Such condulet is formed integral as in the case of the corresponding device previously described, and is provided with a flat rear wall 41 seating against the wall of the building. Oppositely extending integral attaching lugs 42 are provided, similar to the lugs 15, and bolts 43 extend through the lugs for firmly attaching the condulet to the building wall. The condulet 40 also is provided with a lower cylindrical extension 44 to which the conduit is connected in the usual manner. The condulet preferably is provided with parallel side walls and may be provided with a flat top wall 45. The forward face of the condulet is open as at 46 and is provided inwardly of such opening with flanges 47 similar to the flanges 22 previously described. The forward extremity of the top wall 45 has its end extending downwardly to form a lip or lug 48 for a purpose to be described.

A strain insulator is indicated in Figure 5 by the numeral 49 and is provided with a base 50 corresponding in shape and size to and arranged in the opening 46. The inner face of the base 50 seats against the flanges 47 and the upper extremity of the outer face of the base 50 engages behind the lug or flange 48. The insulator is secured against movement with respect to the condulet 45 by a bolt 51 passing through the insulator and through integral ears 52 carried by the condulet. The insulator 49 is provided with a wire attaching opening 53, and from such opening to its outer extremity, the insulator is preferably grooved as at 54. The lead-in wire is carried into the condulet through an opening sloping upwardly and inwardly through the insulator and indicated by the numeral 55.

In each of the forms of the invention previously described, the lead-in wire is soldered to the free end of the service wire, and this is the customary practice. It is practicable to eliminate the soldered connection, however, and means for accomplishing this purpose is illustrated in Figure 6. In this form of the invention, the condulet may be the type illustrated in Figures 1, 2, and 3 and has been designated by the same reference numerals. A different insulator, however, is employed. Referring to Figure 6, the numeral 56 designates the insulator, and such insulator is provided with a base portion 57 corresponding in size and shape to and arranged in the opening 21, and the rear face of the insulator has its upper and lower extremities seated against the flanges 22.

The insulator is attached to the condulet by means of a bolt 58 passing through the insulator and through the ears 27. The insulator is provided with an attaching opening 59, and the insulator is preferably grooved as at 60 from the opening 59 toward the outer end of the insulator. Instead of providing the insulator with an opening through which the lead-in wire extends, the insulator 56 is provided with circular openings 61 through which binding posts 62 extend. These binding posts are provided with the usual nuts 63 at opposite ends for attaching the free ends of the service wires and lead-in wires to the binding posts. Accordingly the device may be completely installed prior to the bringing in of the service wire, and it merely is necessary to attach the free end of the service wires to the binding posts to complete the installation.

The device has been described above in connection with the use of single insulators and condulets, but it will be apparent that variations in the installations may be employed such as the use of multiple condulets and multiple insulators. Such an installation is generally illustrated in Figure 7, wherein the conduit 10 is connected at its upper end to a multiple condulet indicated as a whole by the numeral 64. The condulet 64 is illustrated in Figure 7 as being provided with branches 65, and each of these branches receives the base portion of an insulator 66 which may be of any desired type such as one of the types previously illustrated and described. The form of the device in Figure 7 takes care of a three wire installation wherein the individual wires 67 are dead-ended with respect to the individual insulators 66. The condulet 64 is provided with pairs of attaching lugs 68 arranged opposite the respective insulators 66. For additional safety in attaching the condulet to the wall 14, an additional attaching lug 69 may be provided integral with the condulet at the upper end thereof to receive one of the attaching screws.

The operation of the various forms of the device will be apparent from the foregoing description. Referring to Figures 1 to 3 inclusive, it will be noted that the bolt 26 forms a positive connection between the insulator and the condulet, and the sloping of the forward face of the condulet and its opening 21 performs several functions. In the first place, it will be noted that the base of the insulator fits the opening 21 and a portion of the strain transmitted to the insulator by the wire 31 is taken up by the contact between the upper end of the insulator against the top of the opening 21. The bolt 26 is thus relieved of a portion of the strain. Moreover, the tight engagement between the top of the base of the insulator and the top of the opening 21 minimizes the possibility of any water entering the condulet through the opening 21. In this connection, it will be noted that the upper extremity of the insulator base slopes downwardly, thus draining off any small amount of water which might find its way into the top of the condulet. The sloping of the parts referred to also prevents the entrance of water into the condulet throughout the sides and bottom of the opening 21. The entrance of water into the condulet through the opening 35 is prevented by the downward and outward sloping of such opening.

It will be noted that the attaching lugs 15 seat solidly against the wall 14, and the bolts 16 are arranged substantially in the plane of the wire 31. These bolts accordingly directly carry the strain transmitted to the condulet by the wire 31, and accordingly provide firm anchorage for the condulet.

The operation of the forms of the invention illustrated in Figures 4 and 6 are identical with the form shown in Figures 1, 2, and 3 so far as the features of operation just described are concerned. In the device illustrated in Figure 4, a shorter insulator is employed by virtue of the arrangement of the opening 38 inwardly of the bolt 26, whereas the form of the invention shown in Figure 6 functions in the same manner as the other forms described except that the opening for the lead-in wire is eliminated and binding posts are substituted therefor.

The device illustrated in Figure 5 eliminates the outward extension of the top of the condulet and the sloping of the forward face thereof, and in order to remove a portion of the strain from the bolt 51, the overhanging lip 48 is provided. When the insulator 49 is to be attached to the condulet, the upper end of the base 50 is tilted inwardly toward the condulet and inserted into the space between the lip 48 and flange 47, whereupon the lower portion of the insulator base may be moved inwardly into engagement with the lower flange 47. The bolt 51 is then inserted. It will be noted that the attaching lugs 42 in Figure 5 also are arranged directly in the line of pull to afford firm anchorage for the condulet.

Referring to Figure 7, it will be noted that any individual form of condulet and insulator may be employed, and that the purpose of Figure 7 is merely to illustrate the practicability of employing the elements of the device in multiple wherever desired. For example, either of the condulet forms shown in Figures 1, 4, and 6 may be employed, or the individual projections 65 in Figure 7 may take the form of the forward end of the condulet shown in Figure 5. It will be apparent that each of the forms of the invention illustrated provides a combined strain insulator and condulet, thus eliminating the necessity for the use of the usual service bracket and the additional expense involved in manufacturing costs and labor costs in installation incident to the use of the service brackets. In other words, by the use of the various combination devices illustrated and described, the service wire may be readily and firmly dead-ended to the insulator and the lead-in wire may be readily attached to the service wire.

It is to be understood that the forms of the invention herewith shown and described are to be taken as preferred examples of the same and that various changes in the shape, size, and arrangement of parts may be resorted to without departing from the spirit of the invention or the scope of the subjoined claims.

I claim:

1. A device of the character described comprising a hollow body having an opening for the passage of a conducting wire, and an insulator engaging said body and secured thereto, said insulator having a portion extending from said body and provided with a transverse opening to receive a wire looped therethrough, said insulator being further provided beneath said portion thereof with an opening through which an electrical conductor is adapted to extend.

2. A device of the character described comprising a hollow body having an opening for the passage of a wire therethrough, said body being provided in one side thereof with an opening, and an insulator having a portion arranged in said last named opening and seating against a portion of said body and secured to said body, said insulator having a portion extending from said body and provided with a transverse opening to receive a wire looped therethrough, said insulator being further provided beneath said portion thereof with an opening through which an electrical conductor is adapted to extend.

3. A device of the character described comprising a condulet having an opening for the passage of a conducting wire therethrough, said condulet having one face thereof sloping downwardly and inwardly and provided with an opening therethrough, and an insulator secured to said condulet and having a base portion corresponding in shape and size to and arranged in said opening, said insulator having a portion projecting from said condulet and provided with a transverse opening to receive a wire looped therethrough, said insulator being provided beneath the other opening therethrough with a second opening sloping upwardly and inwardly and through which an electrical conductor is adapted to extend.

4. A device of the character described comprising a hollow body having an opening for the passage of a conducting wire, an insulator engaging said body and secured thereto, said insulator having a portion extending from said body and provided with a transverse opening to receive a wire looped therethrough, said insulator being further provided beneath said portion thereof with an opening through which an electrical conductor is adapted to extend, and means carried by said body for securing it to a support and arranged substantially in the plane of the pull on said insulator.

5. A device of the character described comprising a hollow body having an opening for the passage of a wire therethrough, said body being provided in one side thereof with an opening, an insulator having a portion arranged in said last named opening and seating against a portion of said body and secured to said body, said insulator having a portion extending from said body and provided with a transverse opening to receive a wire looped therethrough, said insulator being further provided beneath said portion thereof with an upwardly and inwardly extending opening through which an electrical conductor is adapted to extend, and means carried by said body for securing it to a support and arranged substantially in the plane of the pull on said insulator.

6. A device of the character described comprising a condulet having an opening for the passage of a conducting wire therethrough, said condulet having one face thereof sloping downwardly and inwardly and provided with an opening therethrough, an insulator secured to said condulet and having a base portion corresponding in shape and size to and arranged in said opening, said insulator having a portion projecting from said condulet and provided with a transverse opening to receive a wire looped therethrough, said insulator being provided beneath the other opening therethrough with a second opening sloping upwardly and inwardly and through which an electrical conductor is adapted to extend, and attaching lugs carried by said condulet and having openings for the passage of fastening elements therethrough arranged substantially in the plane of the pull on said insulator.

7. A device of the character described comprising a condulet having an opening for the passage of a conducting wire, said condulet having one face sloping downwardly and inwardly and provided with an opening therethrough, a strain insulator having a base portion corresponding in shape and size to and arranged in said last named opening, said condulet having projecting ears lying adjacent opposite sides of said insulator, and a bolt passing through said ears and through said insulator, said insulator having a portion projecting from said condulet and provided with a transverse opening to receive a wire looped therethrough and being further provided beneath said portion with an opening extending upwardly and inwardly through said insulator for the passage of an electrical conductor.

8. A device of the character described comprising a condulet having an opening for the passage of a conducting wire, said condulet having one face sloping downwardly and inwardly and provided with an opening therethrough, a strain insulator having a base portion corresponding in shape and size to and arranged in said last named opening, said condulet having projecting ears lying adjacent opposite sides of said insulator, a bolt passing through said ears and through said insulator, said insulator having a portion projecting from said condulet and provided with a transverse opening to receive a wire looped therethrough and being further provided beneath said portion with an opening extending upwardly and inwardly through said insulator for the passage of an electrical conductor, said condulet being provided adjacent the side thereof opposite said second named opening with opposite outstanding lugs having openings therethrough adapted to receive fastening elements and arranged substantially in the line of the pull on said insulator.

9. A device of the character described comprising a condulet having an opening in one side thereof, a strain insulator having a portion projecting from said condulet and provided with a transverse wire receiving opening, said insulator having a base portion corresponding in shape and size to and arranged in said opening, means for securing said insulator to said condulet, said insulator being provided with an opening through its lower portion within the limits of the opening in said condulet, and a binding post carried by said insulator and extending through said last named opening.

10. A device of the character described comprising a condulet having an opening in one side thereof, an insulator having a base portion corresponding in shape and size to and arranged in said opening, means for securing said insulator to said condulet, said condulet being provided with inwardly projecting portions against which the base of said insulator seats, said condulet being further provided adjacent one limit of said opening with a lip overhanging the base portion of said insulator, said insulator having a portion extending from said condulet and provided with a transverse opening to receive a wire looped therethrough and being further provided beneath said last named portion with an opening extending through said insulator and adapted for the passage of an electrical conductor therethrough.

HERBERT E. MILLER.